United States Patent [19]
Bahnsen

[11] 3,945,738
[45] Mar. 23, 1976

[54] DETACHABLE CONNECTIONS FOR CAMERAS OR THE LIKE

[76] Inventor: Gerhard I. W. Bahnsen, Box 1297, South Lake Tahoe, Calif. 95705

[22] Filed: Mar. 22, 1974

[21] Appl. No.: 452,239

[52] U.S. Cl. ............... 403/109; 403/324; 403/378; 248/407
[51] Int. Cl.² .......................................... F16D 7/10
[58] Field of Search .......... 403/107, 379, 108, 378, 403/322, 377, 106, 375, 109, 315, 328, 354, 321, 324, 319, 317, 292, 361; 248/407, 411, 413, 423, 408

[56] References Cited
UNITED STATES PATENTS

| | | | |
|---|---|---|---|
| 1,205,280 | 11/1916 | Sommer | 403/379 |
| 1,756,210 | 4/1930 | Racz | 248/408 |
| 1,787,108 | 12/1930 | Harter | 248/423 |
| 2,431,669 | 11/1947 | Nemeth | 248/413 |
| 3,211,482 | 10/1965 | Sorenson | 403/108 |
| 3,797,948 | 3/1974 | Weininger | 403/354 |

*Primary Examiner*—Andrew V. Kundrat
*Attorney, Agent, or Firm*—William P. Green

[57] ABSTRACT

A detachable connection in which one of two members has an end telescopically receivable within a mating end of another member and carries a locking part threadedly adjustable transversely of the members into and out of locking reception within an enlarged portion of a slot formed in a sidewall of the outer of the two telescopically interfitting elements. The connection may be utilized for detachably securing different camera stands to a quick change adapter tube secured to the body of a camera.

9 Claims, 11 Drawing Figures

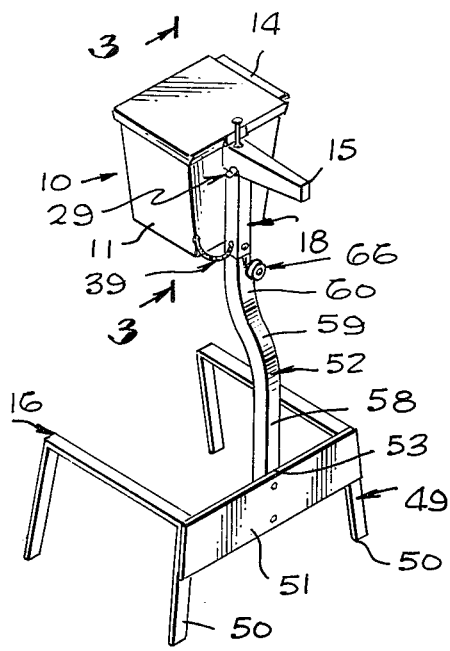
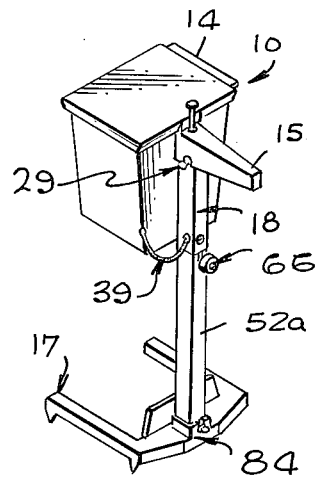
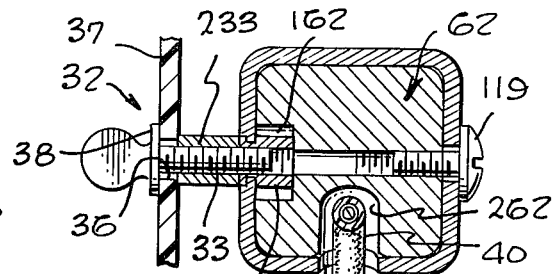
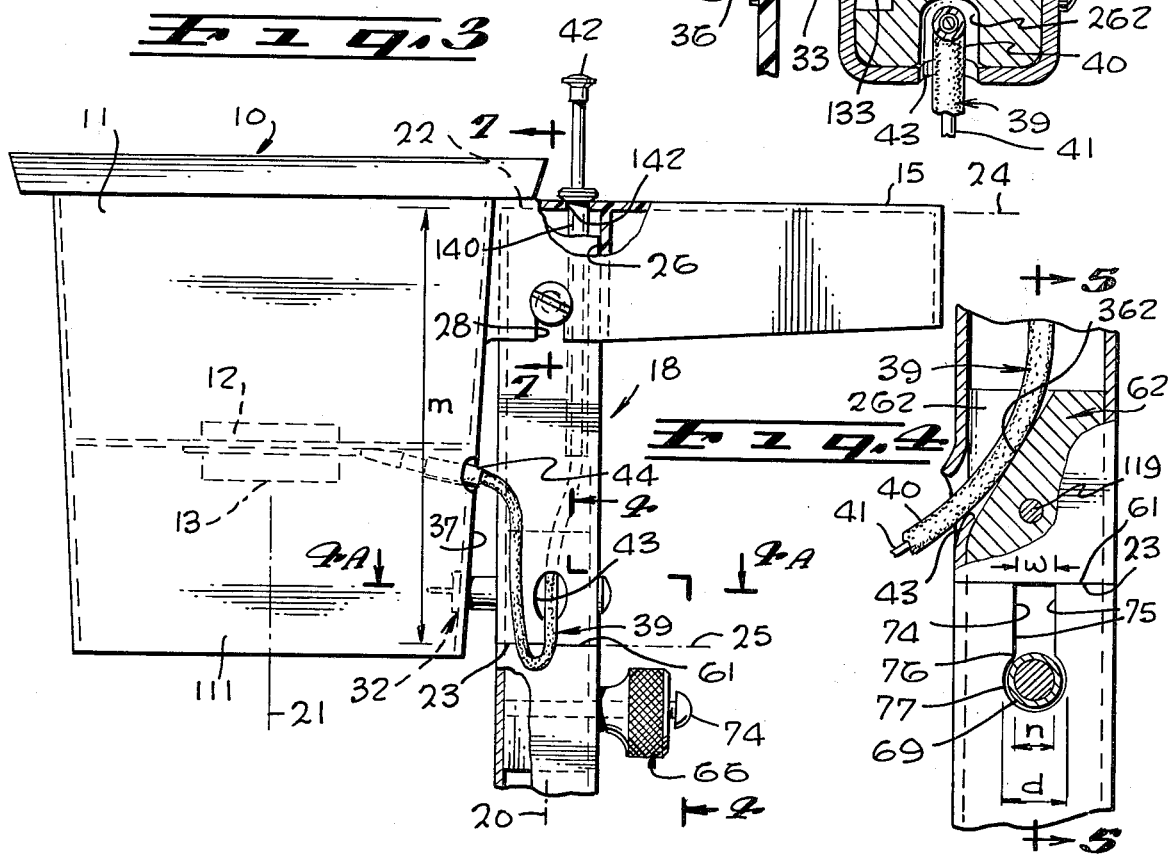

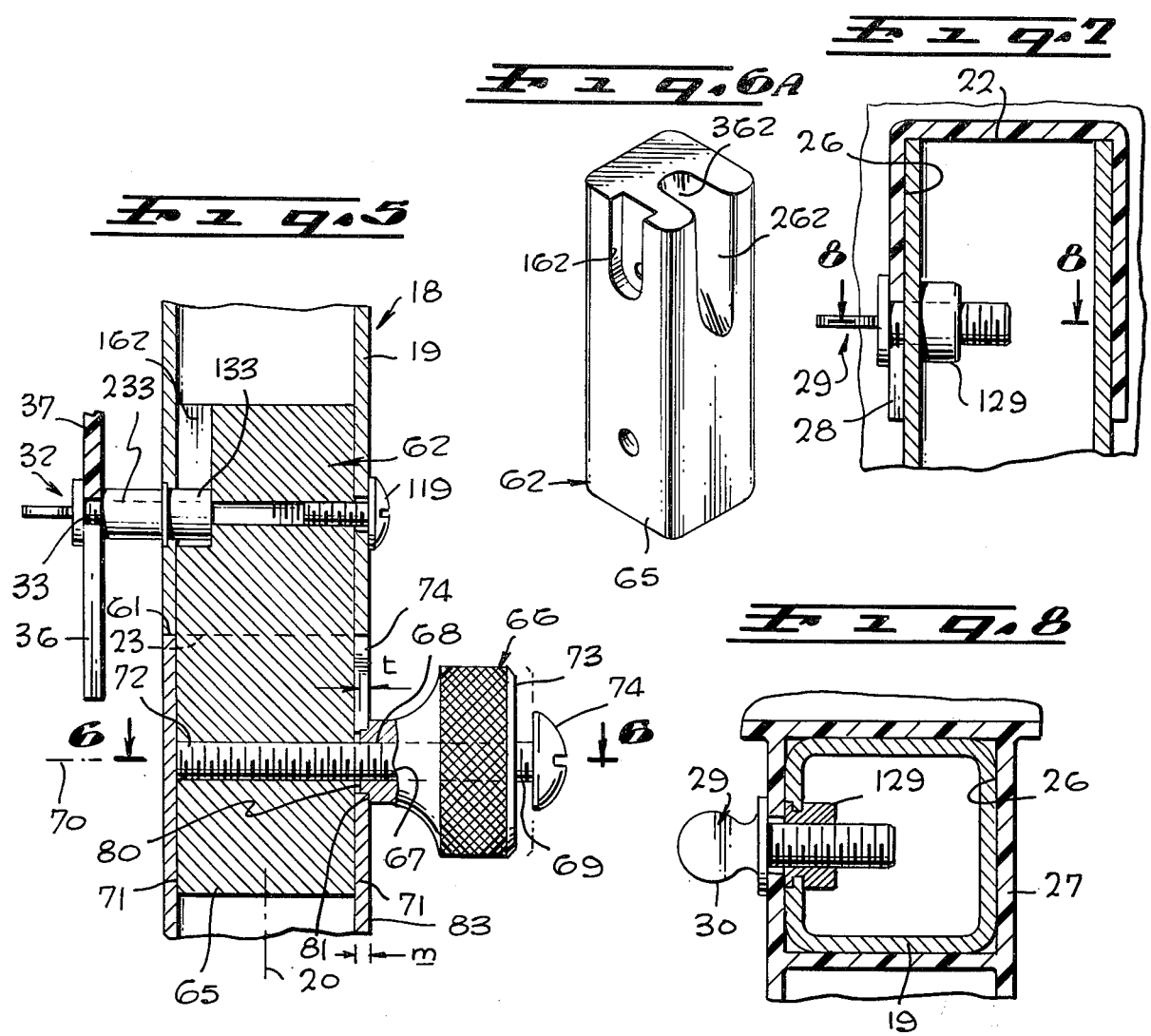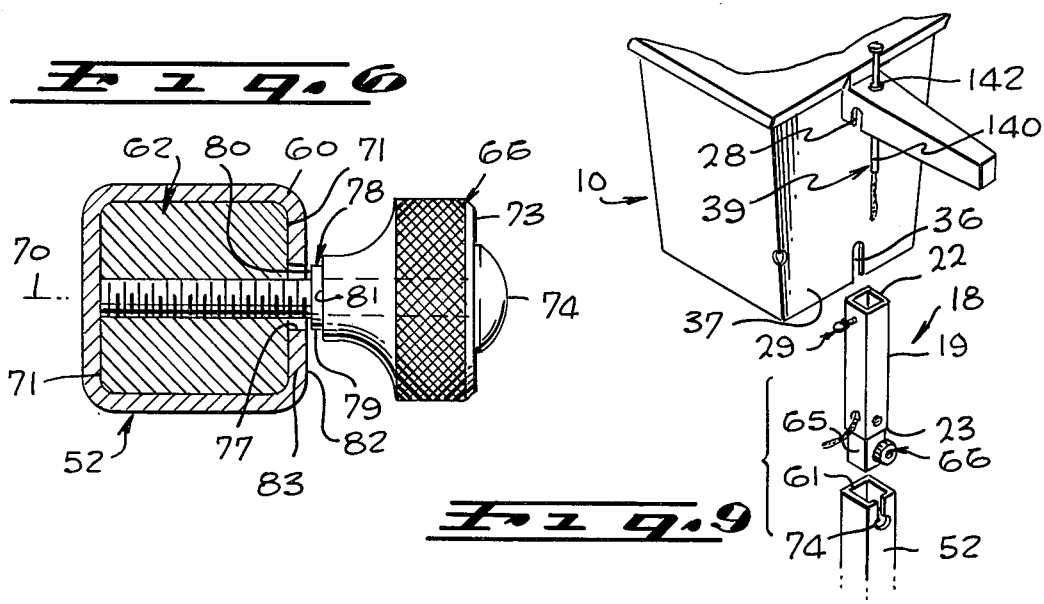

DETACHABLE CONNECTIONS FOR CAMERAS OR THE LIKE

BACKGROUND OF THE INVENTION

This invention relates to quickly detachable connections, of a type having particular adaptability in certain respects for use in connecting a camera selectively to any of various different stands for supporting the camera at different elevations or locations relative to a subject area.

In my prior U.S. Pat. No. 3,742,835 issued July 3, 1973, I have disclosed an assembly in which a camera is supported at the upper end of a tubular support column which projects upwardly from a base adapted to rest on a ground or floor surface, in a relation locating the camera for properly photographing a subject on or near the ground. The upper end of the support column is connected to the camera by reception of the upper end of the column within a downwardly facing socket recess adjacent a handle of the camera. I have also heretofore provided camera stands of the type shown in that prior patent and in which a cable release assembly extends downwardly into the upper end of the tubular support column and then out through an opening in a side of that column to connect to the shutter mechanism of the camera, with the upper end of the cable release mechanism being connected to the camera at or near its mentioned handle.

SUMMARY OF THE INVENTION

A major object of the invention is to provide a unique quickly detachable connection which, among other things, can be utilized in a camera assembly of the above discussed general type, for detachably securing any of two or more differently shaped or dimensioned stands, support columns, or the like to the body of a camera, to support and locate the camera in any of various different positions. For example, one stand may mount the camera at a relatively high elevation above a ground surface, to photograph a fairly large area, while another shorter stand may mount the camera at a lower position to photograph a smaller area in magnified relation.

The connection preferably includes two members having ends which are movable into interfitting connecting relation by relative axial movement of the members toward one another, with one of the members carrying a locking part which is adjustable laterally toward and away from that member and into retaining relation with respect to the other member. The locking part may have an innerportion which is shiftable into and out of an enlarged portion of an open ended slot formed in a wall of one of the members. This inner portion of the locking part effectively retains the two members against relative separating movement, when the locking portion is received within the enlargement of the slot, by virtue of a dimensional relationship which prevents that inner portion of the locking part from moving axially out of the slot through a restricted portion thereof. Thus, the only way to release the locked interrelationship between the two members is to retract the locking part laterally out of the slot. Preferably, the discussed inner portion of the locking element has a thickness dimension which is less than the effective thickness of the wall within which the slot is formed, so that a shoulder on the locking part can be clamped tightly against that wall without interference by the inner portion of the locking part. A structure which connects the locking part to one of the interfitting detachably inter connected members may be smaller than the inner portion of the locking part, and be small enough to itself slide into and out of the slot without difficulty. This structure preferably takes the form of a threaded part, desirably an externally threaded screw on which the locking part is mounted as a relatively adjustable nut.

Certain additional features of the invention relate to the provision of a tubular adapter part of the camera, having a connection to which any of different tubular support columns can be selectively connected, preferably by a connection of the above discussed type. The adapter part may be constructed essentially the same as the upper portion of the support column in the assembly shown in my above discussed prior U.S. Pat. No. 3,742,835. and may be secured to the camera body and carry a cable release in the same manner in which I have heretofore connected the upper end of a single unitary support column to the camera body and a cable release.

BRIEF DESCRIPTION OF THE DRAWINGS

The above and other features and objects of the ivention will be better understood from the following detailed description of the typical embodiment illustrated in the accompanying drawing in which:

FIG. 1 is a perspective view showing a camera mounted to a first type of stand by a connection embodying the invention;

FIG. 2 shows the camera mounted to a second and smaller stand;

FIG. 3 is an enlarged fragmentary vertical section taken on line 3—3 of FIG. 1;

FIG. 4 is a fragmentary view taken on line 4—4 of FIG. 3;

FIG. 4a is an enlarged fragmentary horizontal section taken on line 4a—4a of FIG. 3;

FIG. 5 is a greatly enlarged fragmentary section taken on line 5—5 of FIG. 4;

FIG. 6 is a horizontal section taken on line 6—6 of FIG. 5;

FIG. 6a is a perspective view of one part of the connector structure and a carried locking nut and screw;

FIG. 7 is an enlarged fragmentary vertical section taken on line 7—7 of FIG. 3;

FIG. 8 is a fragmentary horizontal section taken on line 8—8 of FIG. 7; and

FIG. 9 is an exploded perspective view showing the interfitting relationship between the various camera mounting parts.

DESCRIPTION OF THE PREFERRED EMBODIMENT

The camera 10 illustrated in FIGS. 1, 2 and 3 is of a type including a hollow rigid camera body 11 carrying a lens assembly 12 and shutter assembly 13 at its lower end for focusing an image of a photographic subject onto film contained within a film holder 14 extending across the top of the camera body. A handle 15 projects horizontally from the upper or rear portion of the camera body to enable the camera to be held in any desired position by a user, or to be mounted stationarily at the upper end of any of two or more alternatively useable camera mounting stands such as those typically illustrated at 16 in FIG. 1 or 17 in FIG. 2. When the camera is mounted to either of these stands, the camera is directed downwardly to photograph a subject supported on a ground or floor surface on which the stand is located. The stand 16 supports the camera at a higher elevation than stand 17, to photograph a somewhat larger area.

To selectively connect the camera to either of the two stands, or any other desired support or connector structure, in quickly detachable manner, there is secured to the camera body 11 a quick change adapter unit 18. This adapter 18 includes a tubular part 19 whose longitudinal axis 20 extends parallel to optical axis 21 of the camera, and which has a length m approximately equal to the length of the camera body in the direction of axes 20 and 21. At its upper and lower ends, tube 19 has upper and lower edges 22 and 23 lying in planes 24 and 25 disposed transversely of axes 20 and 21. Along its entire axial length between these upper and lower ends, tube 19 is of uniform noncircular cross-section, desirably a square cross-section as brought out in FIGS. 4A and 8. The upper end of tube 19 may be located relative to the camera body by extension upwardly into a downwardly facing socket recess 26 (FIGS. 3 and 8) formed at the underside of handle 15 closely adjacent camera body 11. This recess may be of a rectangular (desirably square) cross-section corresponding substantially to the external cross-section of tube 19, to receive the tube closely within the recess as seen in FIG. 8. The recess may be defined by four vertical walls 27, with one of these walls at a side of the handle containing a downwardly opening slot or notch 28 for receiving the threaded shank of a screw 29 which extends through the side wall of tube 19 and connects threadedly and adjustably into a nut 129 secured rigidly to that side wall. A head 30 at the outer end of screw 29 is tightenable against the adjacent side wall 27 of the handle structure to releaseably retain tube 19 in its FIG. 3 position of reception within recess 26 in the handle.

Near its lower end, the tube 19 is detachably secured to the camera body by a second fastener assembly 32 (FIG. 4A), which includes a screw 33 connected threadedly into a nut 133 rigidly attached to the side wall of tube 19. A tubular spacer 233 about the screw maintains tube 19 in a desired spaced relationship with respect to a side wall 37 of a forward portion 111 of the camera body. During assembly of the parts, screw 33 is slidable upwardly into a downwardly opening slot or notch 36 formed in wall 37 of camera body 11, with a head 38 of the screw being received at and tightenable against the innerside of wall 37, to clamp wall 37 and spacer 233 tightly between tube 19 and head 38 in a manner positively locating the lower end of tube 19 relative to the camera body.

Shutter 13 is adapted to be opened, for taking a picture, by actuation of a conventional cable release unit 39, which includes an outer flexible tubular guide element 40 containing a flexible wire 41 actuable longitudinally to open the shutter by manual depression of an upwardly spring urged push button 42. This elongated assembly extends downwardly through an opening 142 (FIG. 3) formed in the top wall of handle 15 at the location of socket recess 26, and then extends downwardly through the interior of tube 19 to exit laterally through an opening 43 in a side of that tube, and then curve forwardly for connection to a shutter actuating fitting 44 attached to and extending through one of the corners of camera body 11. The outer tube 40 of the cable release is threadedly connectable to fitting 44 in conventional manner, so that axial movement of a plunger carried at the end of wire 41 may act to open the shutter momentarily. At its upper end, the outer flexible tube 40 of cable unit 39 may be attached to and be carried by a rigid vertical tube 140 which is a pressed fit within opening 142 and guides push button 42 for vertical movement.

The stand 16 of FIG. 1 has a base portion 49 forming an essentially U-shaped structure which desirably outlines and defines the area to be photographed by downwardly facing camera 10. The base 49 has a number of legs 50 which project downwardly to support the base and camera on a ground or floor surface. Projecting upwardly from a cross piece 51 of the base, the stand includes an upwardly projecting camera support column 52, which is suitably detachably secured to element 51 at 53, and which may first extend directly upwardly at 58, then curve gradually forwardly at 59, and finally extend directly upwardly at 60 for connection to adapter 18.

This upstanding column 52 is preferably formed as an elongated rigid metal tube, desirably of the same noncircular and optimally square cross sectional configuration as tube 19 of adapter 18 (see FIG. 6). The upper portion 60 of tube 52 is centered about the previously mentioned axis 20 of adapter tube 19 and has its upper horizontal square section edge 61 abutting against the lower edge 23 of tube 19, so portion 60 of tube 52 forms in effect an axially aligned continuation of tube 19.

Mounted within the lower end portion of tube 19, there is provided a preferably solid metal part 62 (FIG. 6A), having a square cross section transversely of axis 21 which corresponds substantially to and is a close fit within, the internal square cross section of tube 19 (FIG. 4A). This part 62 is rigidly secured to tube 19 by a screw 119, which extends through an opening in a side wall of tube 19 and connects threadedly into part 62 at a location opposite and aligned with the previously discussed screw 33 and nut 133. A recess 162 may be provided at the inner side of part 62 to receive nut 133; and a second guideway recess 262 may be provided to pass cable release unit 39 to opening 43. As seen best in FIG. 4, the inner wall 362 of recess 262 may curve porgressively outwardly as it advances downwardly, to effectively guide cable assembly 39 toward and through opening 43 when unit 39 is inserted downwardly through tube 19, during assembly of the apparatus.

The part 62 projects downwardly beyond the lower transverse edge 23 of adapter tube 19, to form a projecting portion 65 which is receivable axially within the upper end portion of column 52 in telescopically closely interfitting relation. This telescopic relationship thus holds adapter 18 and the camera in accurately predeterminable orientation with respect to the support column 52.

For locking tubes 19 and 52 together, I provide a locking part 66, desirably taking the form of a nut having internal threads 67 engaging and adjustably mounted on external threads 68 of a mounting post 69 secured to part 62. This screw element 69 extends along an axis 70 which is perpendicular to and intersects axis 20 of tubes 19 and 52. This axis 70 is also perpendicular to two of the flat side faces 71 of part 62, at the center of their horizontal width. The inner end portion 72 of screw 69 is threadedly connected into part 62, with this threaded connection being a tight friction fit positively retaining screw 69 against removal from part 62 under normal use of the equipment. Nut 66 is actuable along screw 69 between the active locking position of FIG. 5 and the inactive position of FIG. 6, in which the outward retraction of nut 66 is limited by engagement of its outer surface 73 with an enlarged head 74 formed on the screw.

Extending downwardly from its upper edge 61, the tube 52 contains a slot 74 (FIG. 4), having a relatively narrow restricted portion formed by two parallel vertical side edges 75 extending from the upper end of the slot to a location 76, and then having a circular enlargement 77 at the lower end of the slot. The diameter $d$ of this enlargement of the slot is substantially greater than the width $w$ of the upper portion of the slot. This width $w$ is greater than the maximum external diameter $n$ of screw 69, so that upon movement of the adapter and support column axially together, screw 69 can move through slot 74 to a location of reception at the center of the enlargement 77 (when edges 61 and 23 are in contact).

The nut 66 has at its inner end a locking portion 78, which projects into the interior of enlargement 77 of the slot, and which has an external cylindrical surface 79 of a diameter greater than the width $w$ of the upper portion of slot 74. The diameter of portion 78 corresponds approximately to the diameter $d$ of enlargement 77, and fits closely therein in interlocking relation. At the inner extremity of cylindrical surface 79, locking portion 78 has a transverse surface 80, disposed perpendicular to axis 70 and parallel to surfaces 71 of part 62. At the outer end of cylindrical locking portion 78, the nut forms a transverse annular shoulder 81, centered about and perpendicular to axis 70, and adapted to abut against the outer planar surface 82 of sidewall 83 of tube 52 to tightly clamp that sidewall 83 against the adjacent surface 71 of part 62. The axial thickness $t$ of locking portion 78 of the nut is not greater than, and desirably less than, the thickness $m$ of wall 83 of the tube 52, so that locking portion 78 cannot interfere with tight clamping of the nut against wall 83.

When the nut is tightened against wall 83 and to the FIG. 5 locked position, the tube 19 of adapter 18 is very positively retained against axial separation from tube 52, both by clamping of wall 83 between the nut and part 62, and still more positively by reception of the locking portion 78 of the nut within the enlarged portion 77 of the slot. Since locking portion 78 has a diameter which is greater than the width $w$ of the upper portion of slot 74, portion 78 cannot move upwardly through and out of the slot, and therfore locks tubes 19 and 52 against axial separation. When the nut 66 is withdrawn outwardly to its released position of FIG. 6, however, locking portion 78 of the nut is retracted entirely out of the slot, thus freeing tubes 19 and 52 for axial separation, and thereby for very easy detachment of the entire camera from support stand 16.

The stand 17 of FIG. 2 may have a U-shaped base portion 84, defining a smaller photographic area than the stand 16, and carrying an upstanding support column 52a which may be formed of the same square cross section tubing of which part 52 in FIG. 1 is formed, but which is shorter to mount the camera at a lower elevation. The upper end of tube 52a is provided with a slot identical with that shown at 74 on column 52, and discussed in detail above, and is therefore detachably connectible to adapter 18 in the same manner discussed in connection with the first type of stand, to mount the camera selectively at either the higher elevation of FIG. 1 or the lower elevation of FIG. 2. Alternatively, other stands of different dimensional characteristics, or other camera mounting or camera carried structures of any desired type, can be connected to adapter 18 in the same manner, by square cross section tubes having slots as shown at 74. In each case, the cable release mechanism is left attached to the camera, along with the adapter 18, to attain maximum facility in connecting and disconnecting the various stands or other structures.

While a certain specific embodiment of the present invention has been disclosed as typical, the invention is of course not limited to this particular form, but rather is applicable broadly to all such variations as fall within the scope of the appended claims.

I claim:

1. A quick change connection comprising:

two members having two ends respectively to be connected detachably together and movable relative to one another essentially along a predetermined axis between a separated condition and an axially interfitting connected condition;

a locking part mounted at a side of a first of said members for movement relative thereto essentially transversely of said axis and toward and away from a side surface of said first member and between locking and released positions;

a structure extending generally transversely of said axis between said locking part and said first member and mounting said locking part for threaded adjusting movement between said locking and released positions;

the second of said members having a wall which is receivable alongside said side surface of said first member and contains a slot into which said structure is movable through an open end of the slot upon relative movement of the members axially together;

said slot having an enlarged portion spaced axially inwardly from said open end of the slot and having a more restricted reduced width portion axially intermediate said open end and said enlarged portion;

said enlarged portion of said slot extending entirely through the thickness of said wall and having a width transversely of the slot which, through said entire thickness, is greater than the minimum width of said restricted portion of the slot;

said locking part having an inner portion which is receivable within said enlarged portion of said slot in said locking position of the locking part and is retracted out of said enlarged portion of the slot in said released position;

said inner portion of the locking part having a width transversely of the slot which is small enough for reception within the enlarged portion of the slot but is greater than the width of said restricted portion of the slot to thereby prevent axial separation of said members when said inner portion of the locking part is received in the said enlarged portion of the slot;

said restricted portion of the slot being wider than said structure which connects the locking part to said first member to enable movement of said structure along the slot between said open end and said enlarged portion when the locking part is in said released position;

said locking part having a shoulder outwardly beyond said inner portion thereof engageable with said wall about said enlarged portion of the slot in said locking position of the locking part to clamp said wall tightly against said side surface of said first member;

said inner portion of said locking part having a thickness inwardly beyond said shoulder and in the direction of ajdustment of said locking part which is less than the thickness of said wall in the same direction at said enlarged portion of the slot, to avoid contact of said inner portion of the locking part with said first member in a relation preventing said tight clamping engagement of said shoulder with said wall.

2. A connection as recited in claim 1, in which said second member has a tubular end portion into which an end of said first member is telescopically movable in said connected condition.

3. A connection as recited in claim 1, in which said second member has a tubular end portion of non-circular cross section, and said first member has an end portion of essentially similar non-circular cross section receivable telescopically within said tubular end portion and carrying said structure.

4. A connection as recited in claim 1, in which said enlarged portion of said slot is essentially circular, and said inner portion of said locking part is of corresponding essential circular configuration.

5. A connection as recited in claim 1, in which said structure is an externally threaded screw projecting laterally from said first member, and said locking part is a nut threadedly mounted on said screw for locking and releasing movement toward and away from said first member.

6. A connection as recited in claim 1, in which said structure is an externally threaded screw projecting laterally from said first member, and said locking part is a nut threadedly mounted on said screw for locking and releasing movement toward and away from said first member, said screw having an enlarged head outwardly beyond said nut and limiting releasing movement of the nut along and relative to the screw in a direction outwardly away from said first member.

7. A connection as recited in claim 1, in which said second member has an end portion which is essentially tubular and of non-circular cross section and is defined at one side by said wall containing said slot, said first member having a projection at an end thereof telescopically receivable within said tubular portion of said second member and of essentially similar non-circular cross section and having said surface at one side thereof, said structure being an externally threaded screw connected to said first member and projecting laterally therefrom, said locking part being a nut threadedly mounted on said screw for adjusting movement toward and away from said first member.

8. A connection as recited in claim 7, in which said enlarged portion of said slot is essentially circular, said inner portion of said locking part being of essentially circular cross section corresponding essentially to the shape of said enlarged portion of the slot and fitting closely therein.

9. A connection as recited in claim 8, in which said screw has an enlarged head beyond said locking part limiting outward retraction of said locking part about the screw.

* * * * *